(12) United States Patent
Kondoh et al.

(10) Patent No.: US 11,380,038 B2
(45) Date of Patent: Jul. 5, 2022

(54) ANIMATION PRODUCTION SYSTEM FOR OBJECTS IN A VIRTUAL SPACE

(71) Applicant: AniCast RM Inc., Minato-ku (JP)

(72) Inventors: Yoshihito Kondoh, Chuo-ku (JP); Masato Murohashi, Tokyo (JP)

(73) Assignee: AniCast RM Inc., Minato-ku (JP)

( * ) Notice: Subject to any disclaimer, the term of this patent is extended or adjusted under 35 U.S.C. 154(b) by 0 days.

(21) Appl. No.: 17/008,258

(22) Filed: Aug. 31, 2020

(65) Prior Publication Data

US 2022/0036615 A1 Feb. 3, 2022

(30) Foreign Application Priority Data

Jul. 29, 2020 (JP) .............................. JP2020-128304

(51) Int. Cl.
*G06T 13/20* (2011.01)
*G06T 19/00* (2011.01)
*G02B 27/01* (2006.01)

(52) U.S. Cl.
CPC ............ *G06T 13/20* (2013.01); *G06T 19/006* (2013.01); *G02B 27/0172* (2013.01)

(58) Field of Classification Search
CPC .... G06T 13/20; G06T 19/006; G02B 27/0172
See application file for complete search history.

(56) References Cited

U.S. PATENT DOCUMENTS

| | | | |
|---|---|---|---|
| 8,941,666 B1* | 1/2015 | Kovar | G06F 8/34 345/474 |
| 11,049,072 B1* | 6/2021 | Little | G06Q 10/10 |
| 2010/0160040 A1* | 6/2010 | Ikeda | A63F 13/525 463/31 |
| 2012/0086631 A1* | 4/2012 | Osman | A63F 13/525 345/156 |
| 2018/0239420 A1* | 8/2018 | Inomata | G06F 3/012 |
| 2018/0341386 A1* | 11/2018 | Inomata | G02B 27/0093 |
| 2018/0373413 A1* | 12/2018 | Sawaki | H04N 13/378 |
| 2019/0299091 A1* | 10/2019 | Wu | G06F 3/0488 |
| 2020/0236346 A1* | 7/2020 | Kato | H04N 13/111 |

FOREIGN PATENT DOCUMENTS

| | | | |
|---|---|---|---|
| JP | 2017146651 A | 8/2017 | |
| WO | WO-2012007735 A2 * | 1/2012 | ............. A63F 13/06 |

* cited by examiner

*Primary Examiner* — Maurice L. McDowell, Jr.

(57) ABSTRACT

To enable you to take animations in a virtual space, an animation production method comprising: placing a first and second objects and a virtual camera in a virtual space; controlling an action of the first object in response to an operation from the first user; controlling an action of the second object in response to an operation from the second user; and controlling the camera in response to an operation from the first or second user or the second user to shoot the first and second objects.

3 Claims, 11 Drawing Sheets

ANIMATION PRODUCTION SYSTEM FOR OBJECTS IN A VIRTUAL SPACE

TECHNICAL FIELD

The present invention relates to an animation production system.

BACKGROUND ART

Virtual cameras are arranged in a virtual space (see Patent Document 1).

CITATION LIST

Patent Literature

[PTL 1] Patent Application Publication No. 2017-146651

SUMMARY OF INVENTION

Technical Problem

No attempt was made to capture animations in the virtual space.

The present invention has been made in view of such a background, and is intended to provide a technology capable of capturing animations in a virtual space.

Solution to Problem

The principal invention for solving the above-described problem is an animation production method comprising: placing a first and second objects and a virtual camera in a virtual space; controlling an action of the first object in response to an operation from the first user; controlling an action of the second object in response to an operation from the second user; and controlling the camera in response to an operation from the first or second user or the second user to shoot the first and second objects.

The other problems disclosed in the present application and the method for solving them are clarified in the sections and drawings of the embodiments of the invention.

Advantageous Effects of Invention

According to the present invention, animations can be captured in a virtual space.

DESCRIPTION OF EMBODIMENTS

Figure 1:
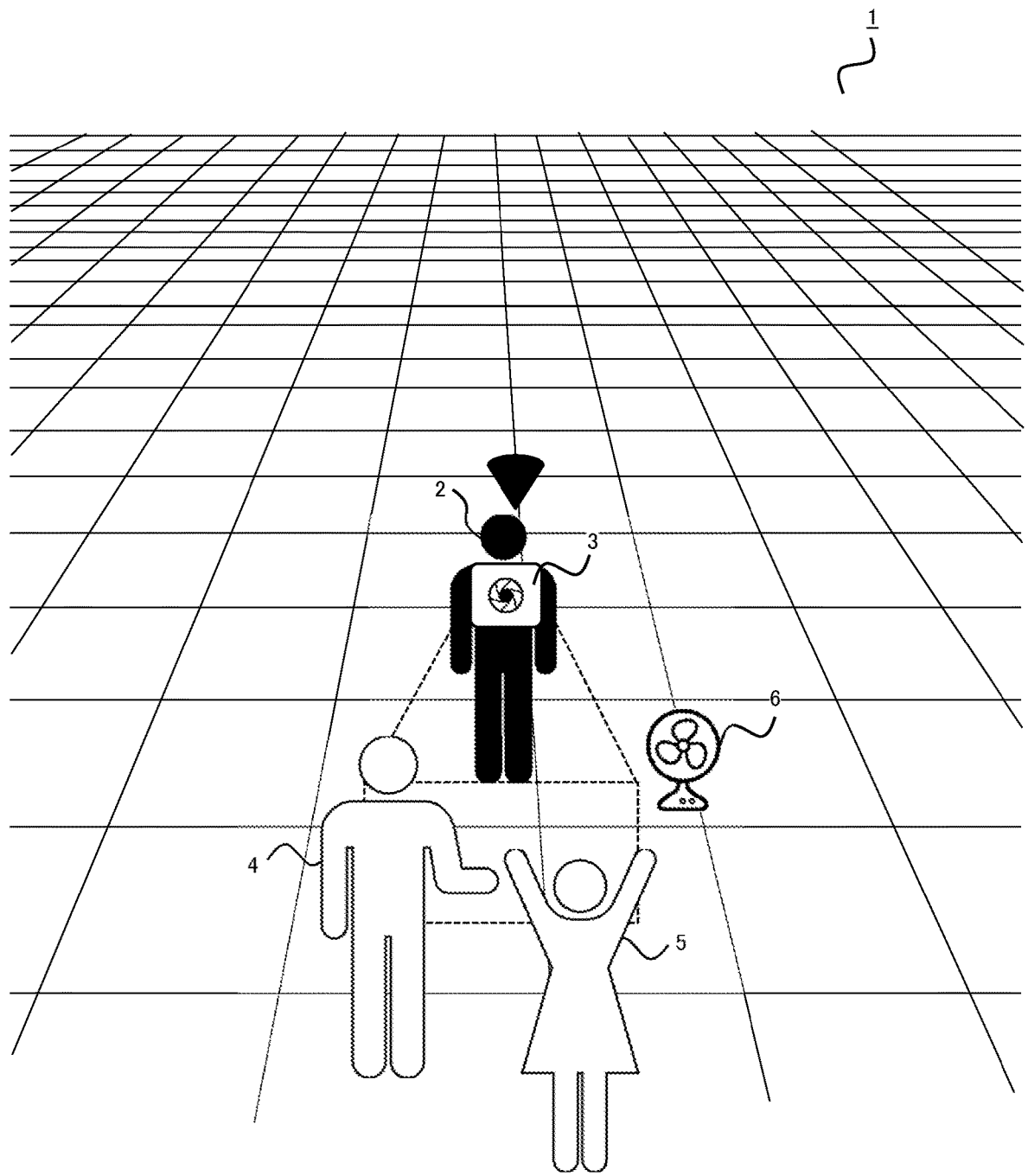
FIG. 1 is a diagram illustrating an example of a virtual space displayed on a head mount display (HMD) mounted by a user in an animation production system of the present embodiment.

The contents of embodiments of the present invention will be described with reference. An animation production method according to an embodiment of the present invention has the following configuration.

[Item 1]
An animation production method comprising:
placing a first and second objects and a virtual camera in a virtual space;
controlling an action of the first object in response to an operation from the first user;
controlling an action of the second object in response to an operation from the second user; and
controlling the camera in response to an operation from the first or second user or the second user to shoot the first and second objects.

[Item 2]
The animation production method according to item 1, the method further comprising:
recording the action of the first object in a first track; and
controlling the action of the second object while playing back the action of the first object recorded on the first track.

[Item 3]
The animation production method according to item 1, wherein:
the second object is the same object as the first object, the method further comprising:
recording the action of the first object in a first track; and
changing the action of the first object in response to the operation of the second user while playing back the action of the first object recorded in the first track.

A specific example of an animation production system according to an embodiment of the present invention will be described below with reference to the drawings. It should be noted that the present invention is not limited to these examples, and is intended to include all modifications within the meaning and scope of equivalence with the appended claims, as indicated by the appended claims. In the following description, the same elements are denoted by the same reference numerals in the description of the drawings and overlapping descriptions are omitted.

Overview

FIG. 1 is a diagram illustrating an example of a virtual space displayed on a head mount display (HMD) mounted by a user in an animation production system of the present embodiment. In the animation production system of the present embodiment, a character 4 and a camera 3 are disposed in the virtual space 1, and a character 4 is shot using the camera 3. In the virtual space 1, the photographer 2 is disposed, and the camera 3 is virtually operated by the photographer 2. In the animation production system of the present embodiment, as shown in FIG. 1, a user makes an animation by placing a character 4 and a camera 3 while viewing the virtual space 1 from a bird's perspective with a TPV (Third Person's View), taking a character 4 with an FPV (First Person View; first person support) as a photographer 2, and performing a character 4 with an FPV. In the virtual space 1, a plurality of characters (in the example shown in FIG. 1, a character 4 and a character 5) can be disposed, and the user can perform the performance while possessing a character 4 and a character 5, respectively. That is, in the animation production system of the present embodiment, one can play a number of roles (roles). In addition, since the camera 3 can be virtually operated as the photographer 2, natural camera work can be realized and the representation of the movie to be shot can be enriched. In addition, in the animation production system of the present embodiment, a plurality of users can collaborate to produce an animation. For example, one user may operate the character 4 to perform the performance, and another user may operate the camera man 2 to photograph the performance of the character 4 by the camera 3. In addition, the lighting engineer performing lighting and the mixer performing voice mixing can be performed by the third and fourth users to share the work required for one animation. In addition, the animation production system of the present embodiment can perform these tasks asynchronously. That is, after the first user operates the character 4 and performs the performance, the second user operates the camera man 2 to take a photograph with one or more cuts while changing the angle of the camera 3, and then the lighting engineer performs the lighting while adjusting the color, position, and timing of the lighting, so that the photographing operation can be performed asynchronously.

General Configuration

Figure 2:
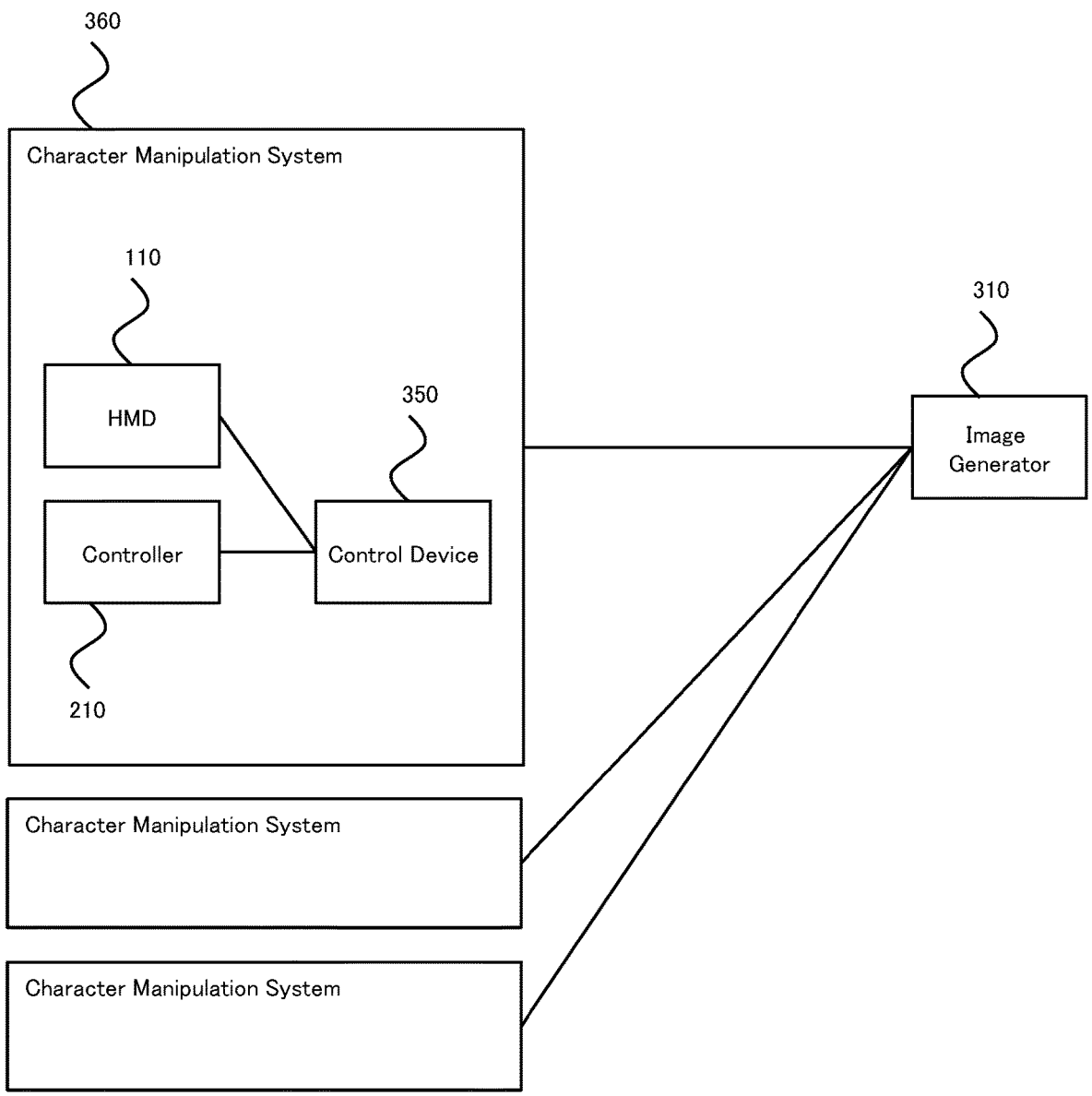
FIG. 2 is a diagram illustrating an example of the overall configuration of an animation production system 300 according to an embodiment of the present invention.

FIG. 2 is a diagram illustrating an example of the overall configuration of an animation production system 300 according to an embodiment of the present invention. The animation production system 300 may comprise a plurality of character manipulation systems 360 and an image generator 310 serving as a host computer. The character manipulation system 360 may also include, for example, an HMD 110, a controller 210, and a control device 350 for controlling them. An infrared camera (not shown) for detecting the position, orientation and slope of the HMD 110 or the controller 210 can also be added to the character manipulation system 360. These devices may be connected to each other by wired or wireless means. For example, each device may be equipped with a USB port to establish communication by cable connection, or communication may be established by wired or wireless, such as HDMI, wired LAN, infrared, Bluetooth™, WiFi™. The control device 350 may be a PC, a game machine, a portable communication terminal, or any other device having a calculation processing function. The control device 350 is communicatively connected to the image generating device 310 and can transmit input information from the user by the HMD 110 or the controller 210 to the image generating device 310.

HMD 110

Figure 3:
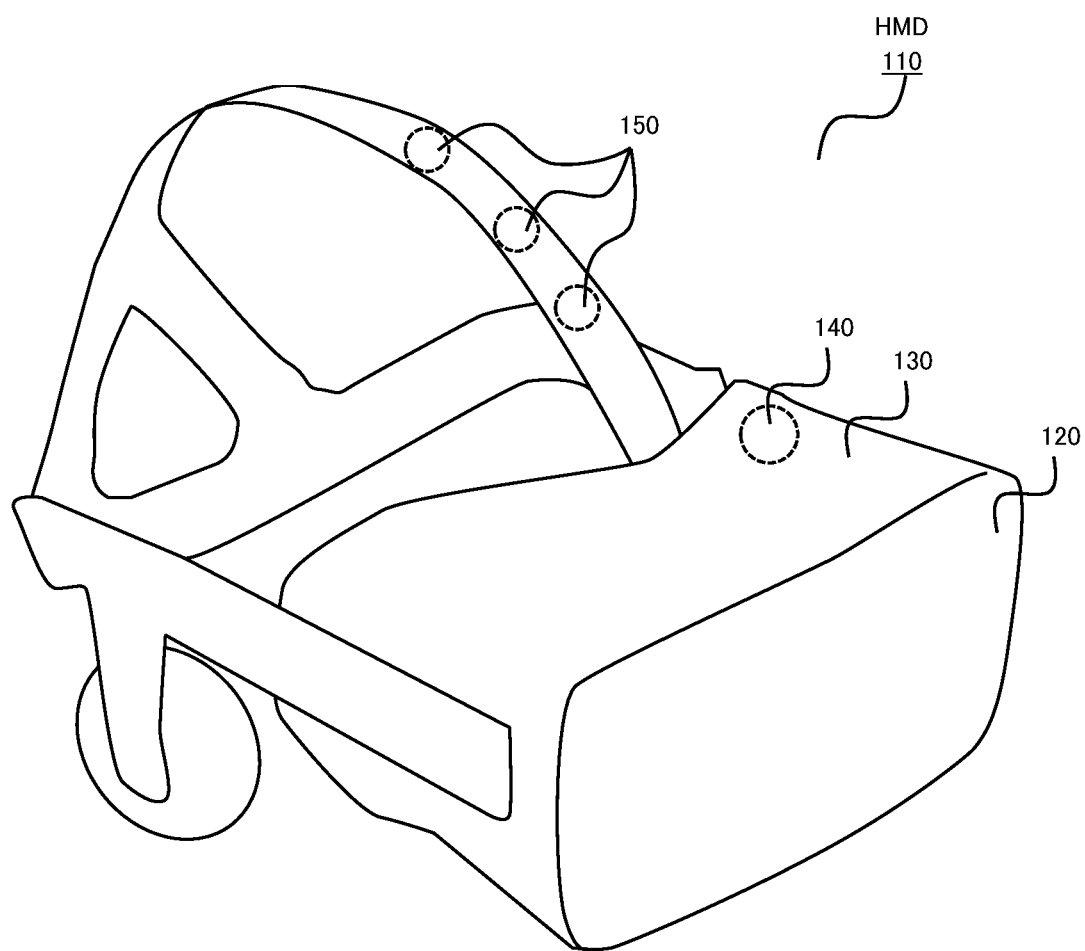
FIG. 3 shows a schematic view of the appearance of a head mount display (hereinafter referred to as an HMD) 110 according to the present embodiment.
Figure 5:
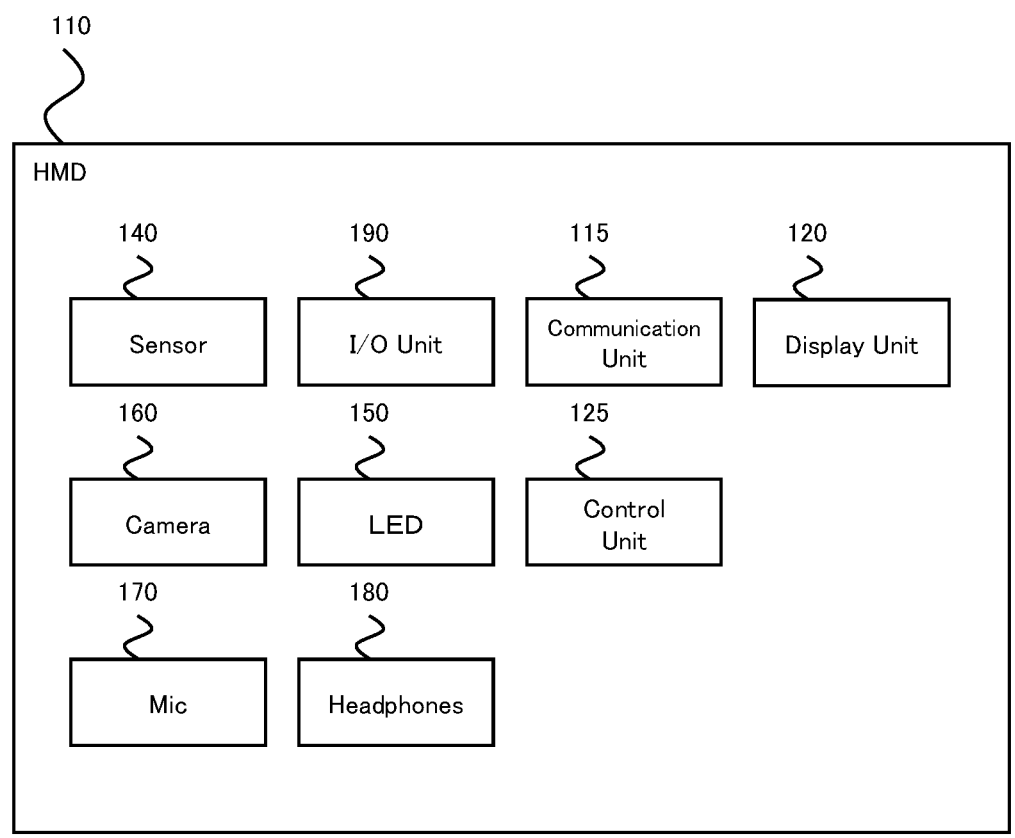
FIG. 5 shows a functional configuration diagram of the HMD 110 according to the present embodiment.

FIG. 3 shows a schematic view of the appearance of a head mount display (hereinafter referred to as HMD) 110 according to the present embodiment. FIG. 5 shows a functional configuration diagram of the HMD 110 according to the present embodiment. The HMD 110 is mounted on the user's head and includes a display panel 120 for placement in front of the user's left and right eyes. Although an optically transmissive and non-transmissive display is contemplated as the display panel, this embodiment illustrates anon-transmissive display panel that can provide more immersion. The display panel 120 displays a left-eye image and a right-eye image, which can provide the user with a three-dimensional image by utilizing the visual difference of both eyes. If left- and right-eye images can be displayed, a left-eye display and a right-eye display can be provided separately, and an integrated display for left-eye and right-eye can be provided.

The housing portion 130 of the HMD 110 includes a sensor 140. The sensor 140 may comprise, for example, a magnetic sensor, an acceleration sensor, or a gyro sensor, or a combination thereof, to detect actions such as the orientation or tilt of the user's head. When the vertical direction of the user's head is Y-axis, the axis corresponding to the user's anteroposterior direction is Z-axis, which connects the center of the display panel 120 with the user, and the axis corresponding to the user's left and right direction is X-axis, the sensor 140 can detect the rotation angle around the X-axis (so-called pitch angle), rotation angle around the Y-axis (so-called yaw angle), and rotation angle around the Z-axis (so-called roll angle).

In place of or in addition to the sensor 140, the housing portion 130 of the HMD 110 may also include a plurality of light sources 150 (e.g., infrared light LEDs, visible light LEDs). A camera (e.g., an infrared light camera, a visible light camera) installed outside the HMD 110 (e.g., indoor, etc.) can detect the position, orientation, and tilt of the HMD 110 in a particular space by detecting these light sources. Alternatively, for the same purpose, the HMD 110 may be provided with a camera for detecting a light source installed in the housing portion 130 of the HMD 110.

The housing portion 130 of the HMD 110 may also include an eye tracking sensor. The eye tracking sensor is used to detect the user's left and right eye gaze directions and gaze. There are various types of eye tracking sensors. For example, the position of reflected light on the cornea, which can be irradiated with infrared light that is weak in the left eye and right eye, is used as a reference point, the position of the pupil relative to the position of reflected light is used to detect the direction of the eye line, and the intersection point in the direction of the eye line in the left eye and right eye is used as a focus point.

Controller 210

Figure 4:
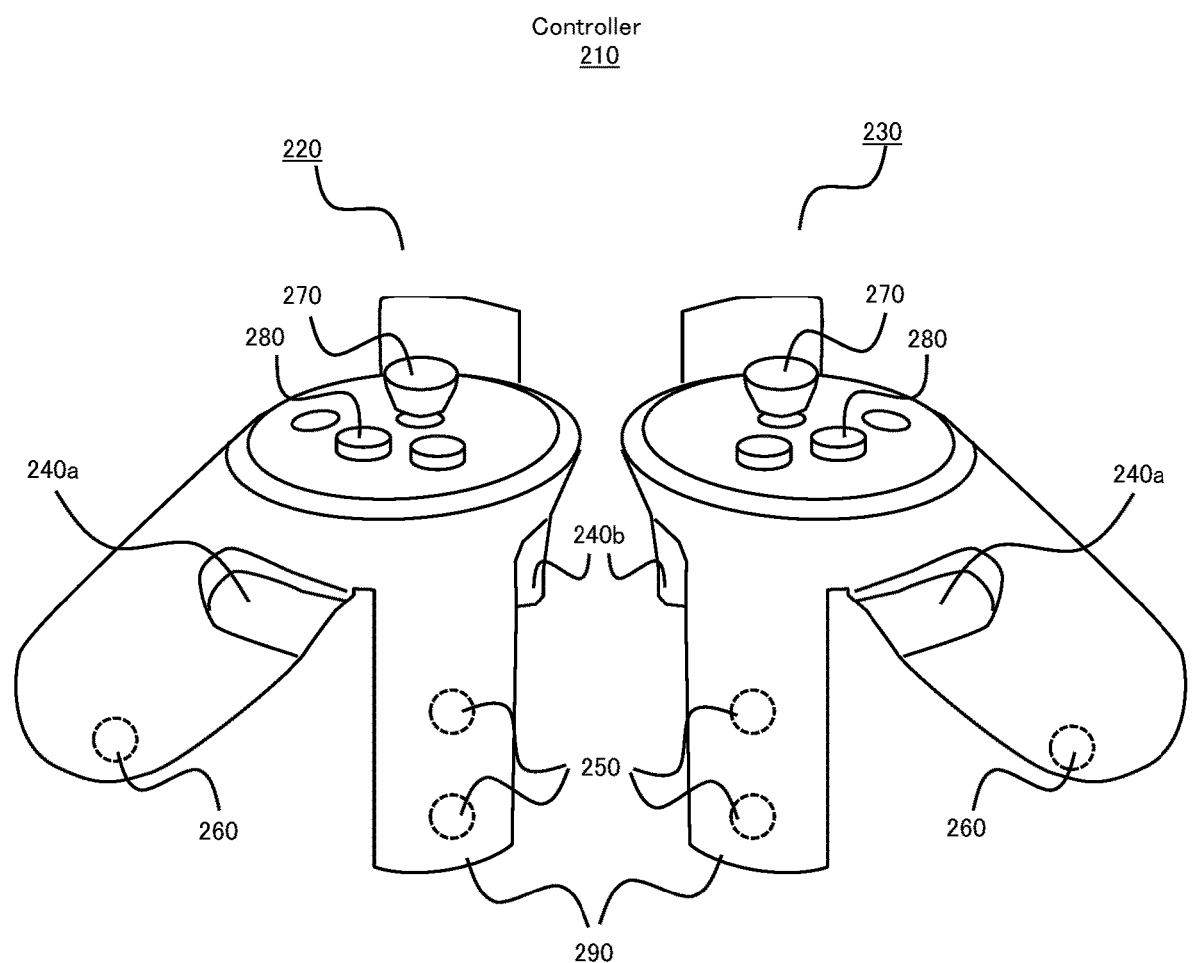
FIG. 4 shows a schematic view of the outside of the controller 210 according to the present embodiment.
Figure 6:
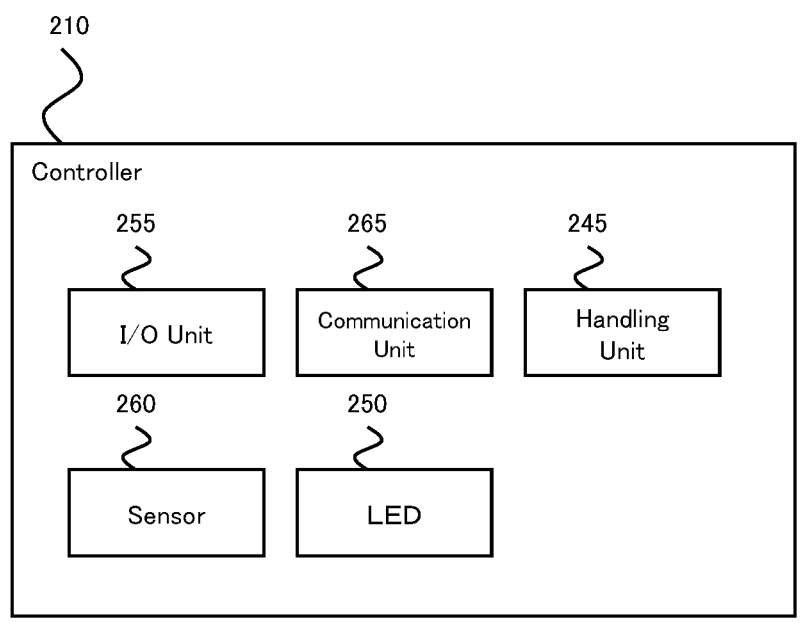
FIG. 6 shows a functional configuration diagram of the controller 210 according to the present embodiment.

FIG. 4 shows a schematic view of the appearance of the controller 210 according to the present embodiment. FIG. 6 shows a functional configuration diagram of the controller 210 according to the present embodiment. The controller 210 can support the user to make predetermined inputs in the virtual space. The controller 210 may be configured as a set of left-hand 220 and right-hand 230 controllers. The left hand controller 220 and the right hand controller 230 may each have an operational trigger button 240, an infrared LED 250, a sensor 260, a joystick 270, and a menu button 280.

The operation trigger button 240 is positioned as 240*a*, 240*b* in a position that is intended to perform an operation to pull the trigger with the middle finger and index finger when gripping the grip 235 of the controller 210. The frame 245 formed in a ring-like fashion downward from both sides of the controller 210 is provided with a plurality of infrared LEDs 250, and a camera (not shown) provided outside the controller can detect the position, orientation and slope of the controller 210 in a particular space by detecting the position of these infrared LEDs.

The controller 210 may also incorporate a sensor 260 to detect operations such as the orientation or tilt of the controller 210. As sensor 260, it may comprise, for example, a magnetic sensor, an acceleration sensor, or a gyro sensor, or a combination thereof. Additionally, the top surface of the controller 210 may include a joystick 270 and a menu button 280. It is envisioned that the joystick 270 may be moved in a 360 degree direction centered on the reference point and operated with a thumb when gripping the grip 235 of the controller 210. Menu buttons 280 are also assumed to be operated with the thumb. In addition, the controller 210 may include a vibrator (not shown) for providing vibration to the hand of the user operating the controller 210. The controller 210 includes an input/output unit and a communication unit for outputting information such as the position, orientation, and slope of the controller 210 via a button or a joystick, and for receiving information from the host computer.

With or without the user grasping the controller 210 and manipulating the various buttons and joysticks, and with information detected by the infrared LEDs and sensors, the system can determine the user's hand operation and attitude, pseudo-displaying and operating the user's hand in the virtual space.

Control Device 350

Figure 7:
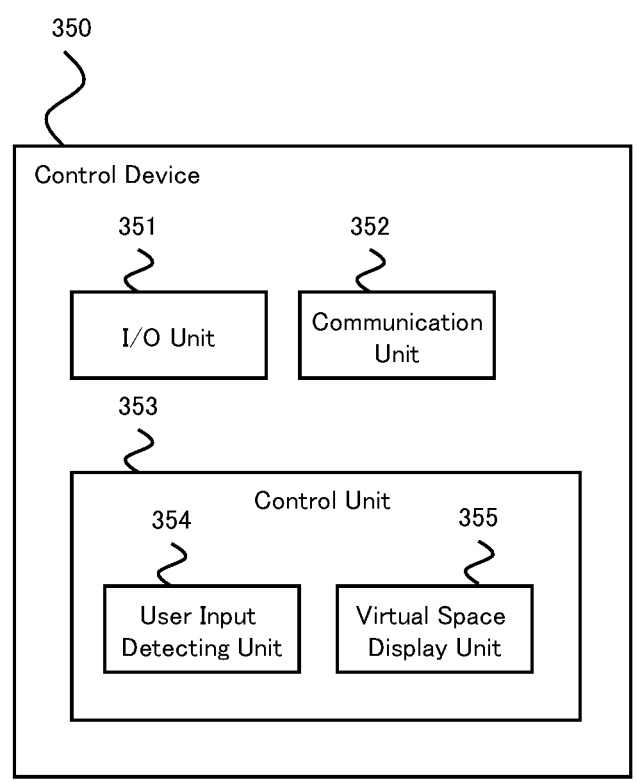
FIG. 7 is a diagram illustrating a functional configuration of a control device 350 according to the present embodiment.

FIG. 7 shows a functional configuration diagram of a control device 350 according to the present embodiment. The control device 350 may use a device such as a PC, a game machine, or a portable communication terminal, which has a function for storing information about the user's head operation or operation of the controller acquired by the user input information or the sensor, which is transmitted from the HMD 110 or the controller 210, performing a predetermined computational processing, and generating an image. The control device 350 may include, for example, an input/output unit 351 for establishing a wired connection with a peripheral device such as an HMD 110 or controller 210, and a communication unit 352 for establishing a wireless connection such as infrared, Bluetooth, or WiFi. Information received from the HMD 110 and/or the controller 210 through the I/O unit 351 and/or the communication unit 352 regarding the operation of the user's head or the operation or operation of the controller is detected in the control unit 353 as input content including the operation of the user's position, line of vision, posture, etc., speech, pronunciation, operation, etc. The control unit 353 may be composed of a CPU. However, by further providing a GPU specialized for image processing, information processing and image processing can be distributed and overall processing efficiency can be improved. The control unit 353 includes a user input detecting unit 354 which detects information (input information) received from the HMD 110 and/or the controller 210 regarding the operation of the user's head, the speech and pronunciation of the user, and the operation and operation of the controller. The input information is solved by the communication unit 330 and transmitted to the image producing device 310. The communication unit 330 also receives information for reproducing the virtual space 1 from the image producing device 310 (which may be rendered video data or model information of an object disposed in a virtual space) and can display the virtual space 1 on the HMD 110 by the virtual space display unit 355 based on this information.

Image Generator 310

Figure 8:
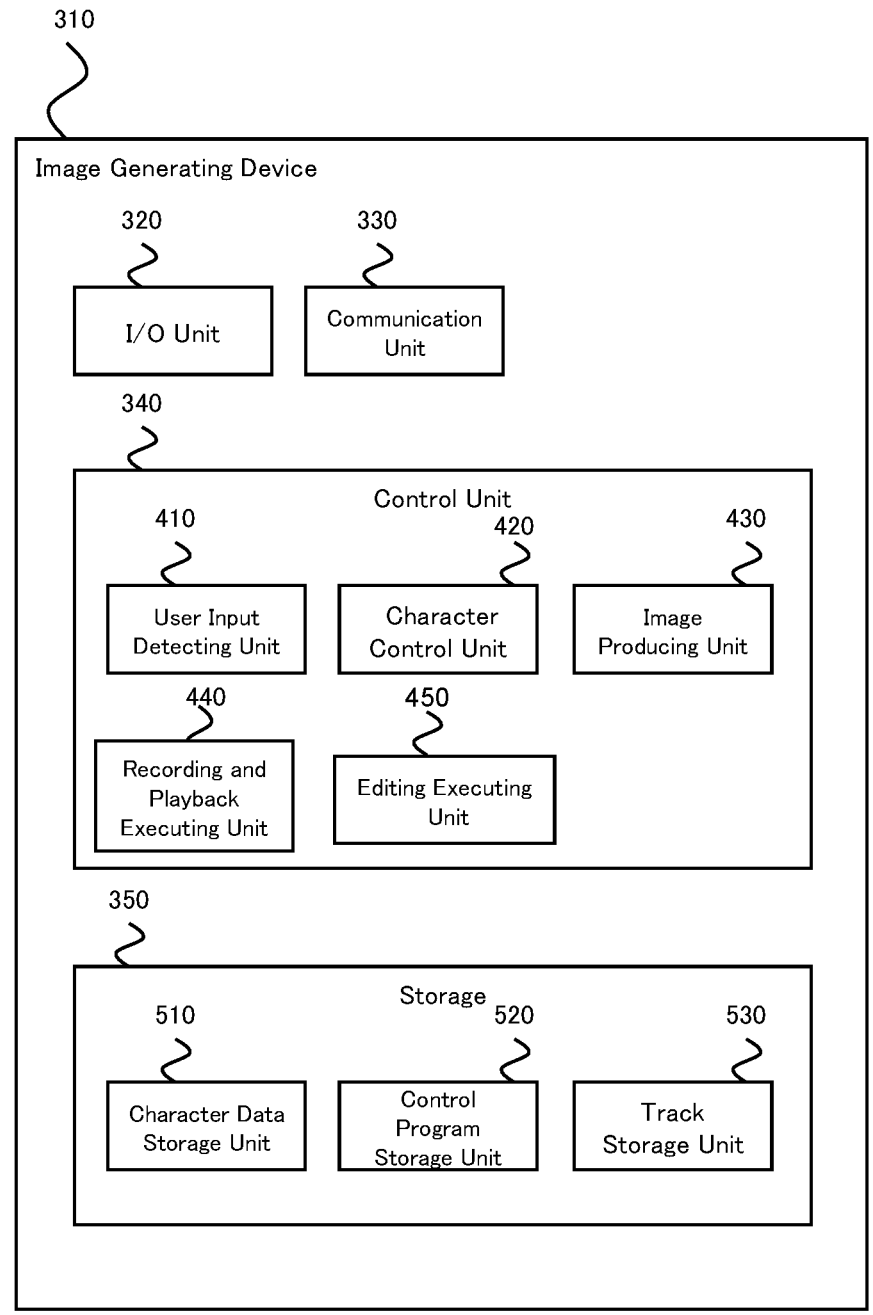
FIG. 8 shows a functional configuration diagram of an image producing device 310 according to the present embodiment.

FIG. 8 shows a functional configuration diagram of an image producing device 310 according to this embodiment. The image generating device 310 may be a general purpose computer, such as a workstation or personal computer, or may be logically implemented by cloud computing. The image producing device 310 may include an input/output unit 320 for establishing a connection between the HMD 110 and the controller 210, for example, when the image producing device 310 includes a peripheral device such as an HMD 110 or a controller 210, and a communication unit 330 for establishing a connection by wires such as infrared, Bluetooth, WiFi, or a registered trademark, or a public telephone line. Information (input information) relating to the operation of the user's head or the operation or operation of the controller (input information) input from the HMD 110 and/or the controller 210 in the character manipulation system 360 is transmitted to the control unit 340, and is detected in the control unit 340 as input content including the operation of the user's position, line of vision, attitude, etc., speech, pronunciation, operation, etc., and a control program stored in the storage unit 350 is executed in accordance with the user's input content to perform a process such as controlling the character and generating an image. The control unit 340 may be composed of a CPU. However, by further providing a GPU specialized for image processing, information processing and image processing can be distributed and overall processing efficiency can be improved. The image generating device 310 may also communicate with other computing processing devices to allow other computing processing devices to share information processing and image processing.

The control unit 340 includes a user input receiving unit 410 for acquiring input information from a user, a character control unit 420 for executing a control program stored in the control program storage unit 520 for a character stored in the character data storage unit 510 of the storage unit 350, and an image producing unit 430 for generating an image based on a character control. Here, the control of the operation of a character can be realized by converting input information, such as the direction or tilt of the user head detected through the HMD 110 or the controller 210, or the manual operation, into the operation of each portion of the bone structure created in accordance with the movement or restriction of the joints of the human body, and applying the operation of the bone structure to the previously stored character data by relating the bone structure. The character control unit 420 can operate various objects in the virtual space 1, such as a character 4 or a camera 3, according to operation by a plurality of users received from the plurality of character manipulation systems 350. For example, the operation of the character 4 can be controlled based on the input information received from the first user from the first character manipulation system 360, and the camera 2 can be operated based on the input information received from the second user from the second character manipulation system 360 to control the camera 3. This allows a division of labor in which the first user performs the performance of the character 4 and the second user photographs it. Further, the control unit 340 includes a recording and playback executing unit 440 for recording and playing back an image-generated character on a track, and an editing executing unit 450 for editing each track and generating the final content.

The storage unit 350 includes a character data storage unit 510 for storing not only image data of a character but also information related to a character such as attributes of a character. The control program storage unit 520 stores a program for controlling the operation of a character or an expression in the virtual space. The storage unit 350 includes a track storage unit 530 for storing action data composed of parameters for controlling the movement of a character in a dynamic image generated by the image producing unit 430.

Figure 9:
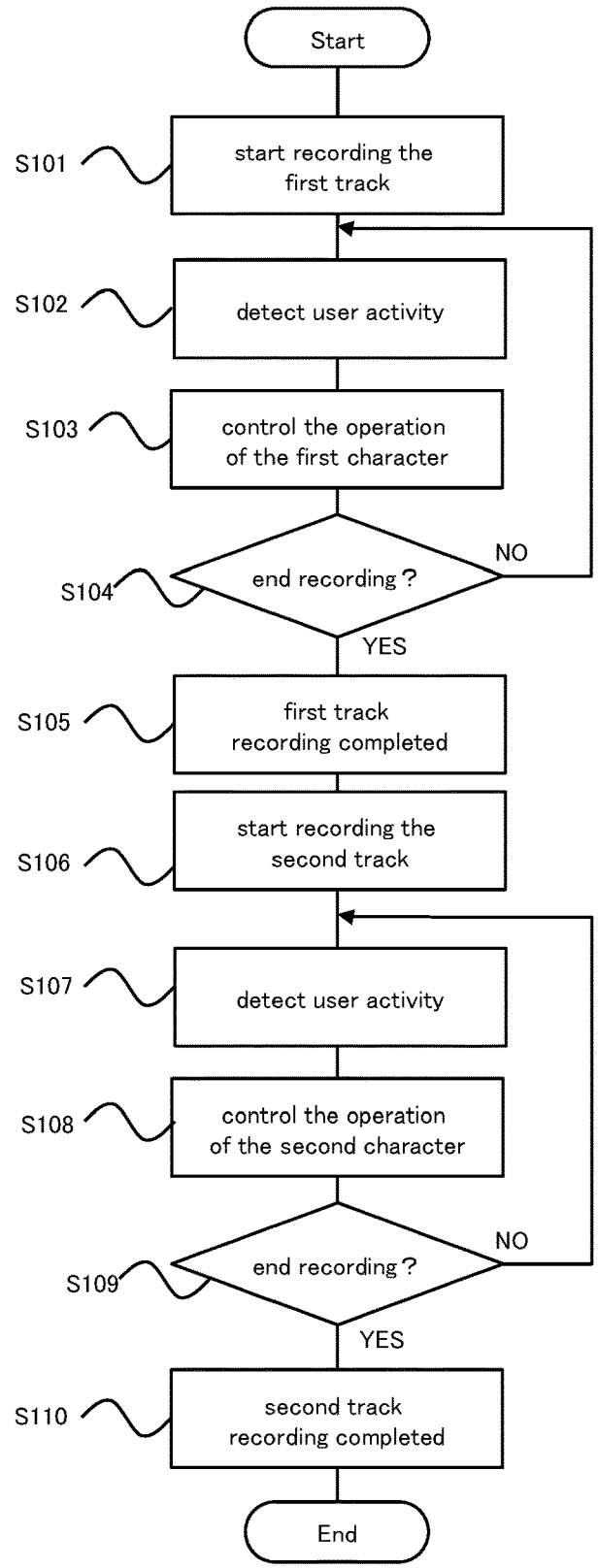
FIG. 9 is a flowchart illustrating an example of a track generation process according to an embodiment of the present invention.

FIG. 9 is a flowchart illustrating an example of a track generation process according to an embodiment of the present invention.

First, the recording and reproduction executing unit 440 of the control unit 340 of the image producing device 310 starts recording for storing action data of the moving image related to operation by the first character in the virtual space in the first track of the track storage unit 530 (S101). Here, the position of the camera where the character is to be shot and the viewpoint of the camera (e.g., FPV, TPV, etc.) can be set. For example, in the virtual space 1 illustrated in FIG. 1, the position where the cameraman 2 is disposed and the angle of the camera 3 can be set with respect to the character 4 corresponding to the first character. The recording start operation may be indicated by a remote controller, such as controller 210, or may be indicated by other terminals. The operation may also be performed by a user who is equipped with an HMD 110 to manipulate the controller 210, to play a character, or by a user other than the user who performs the character. In addition, the recording process may be automatically started based on detecting an operation by a user who performs the character described below.

Subsequently, the user input detecting unit 410 of the control unit 340 detects information received from the HMD 110 and/or the controller 210 relating to the operation of the user's head, speech or pronunciation of the user, and operation or operation of the controller (S102). For example, when the user mounting the HMD 110 tilts the head, the sensor 140 provided in the HMD 110 detects the tilt and transmits information about the tilt to the image generating device 310. The image generating device 310 receives information about the operation of the user through the communication unit 330, and the user input detecting unit 410 detects the operation of the user's head based on the received information. Also, when a user performs a predetermined operation or operation, such as lifting the controller 210 or pressing a button, the sensor 260 provided in the controller detects the operation and/or operation and transmits information about the operation and/or operation to the image generating device 310 using the controller 210. The image producing device 310 receives information related to the user's controller operation and operation through the communication unit 330, and the user input detecting unit 410 detects the user's controller operation and operation based on the received information.

Subsequently, the character control unit 420 of the control unit 340 controls the operation of the first character in the virtual space based on the operation of the detected user (S103). For example, based on the user detecting an operation to tilt the head, the character control unit 420 controls to tilt the head of the first character. Also, based on the fact that the user lifts the controller and detects pressing a predetermined button on the controller, the character control unit 420 controls something while extending the arm of the first character upward. In this manner, the character control unit 420 controls the first character to perform the corresponding operation each time the user input detecting unit 410 detects an operation by a user transmitted from the HMD 110 or the controller 210. Stores parameters related to the operation and/or operation detected by the user input detecting unit 410 in the first track of the track storage unit 530. Alternatively, the character may be controlled to perform a predetermined performance action without user input, the action data relating to the predetermined performance action may be stored in the first track, or both user action and action data relating to the predetermined behavior may be stored.

Subsequently, the recording and reproduction executing unit 440 confirms whether or not the user receives the instruction to end the recording (S104), and when receiving the instruction to end the recording, completes the recording of the first track related to the first character (S105). The recording and reproduction executing unit 440 continues the recording process unless the user receives an instruction to end the recording. Here, the recording and reproduction executing unit 440 may perform the process of automatically completing the recording when the operation by the user acting as a character is no longer detected. It is also possible to execute the recording termination process at a predetermined time by activating a timer rather than accepting instructions from the user.

Subsequently, the recording and playback executing unit 440 starts recording for storing action data of the moving image associated with operation by the second character in the virtual space in the second track of the track storage unit 530 (S106). Here, the position of the camera where the character is to be shot and the viewpoint of the camera (e.g., FPV, TPV, etc.) can be set. For example, in the virtual space 1 illustrated in FIG. 1, the position where the cameraman 2 is disposed and the angle of the camera 3 can be set with respect to the character 5 corresponding to the second character. For example, the user may set the camera viewpoint by the FPV of the character 5, perform the playback processing of the first track, and perform the desired operation by the user who performs the character 5 while checking the operation of the character 4. The recording start operation may be indicated by a remote controller, such as controller 210, or may be indicated by other terminals. The operation may also be performed by a user who is equipped with an HMD 110 to manipulate the controller 210, to play a character, or by a user other than the user who performs the character. The recording process may also be automatically initiated based on the detection of an action and/or operation by the user performing the characters described below.

Subsequently, the user input detecting unit 410 of the control unit 340 detects information received from the HMD 110 and/or the controller 210 relating to the operation of the user's head, speech or pronunciation of the user, and operation or operation of the controller (S107). Here, the user may be the same user as the user performing the first character, or may be a different user. For example, when the user mounting the HMD 110 tilts the head, the sensor 140 provided in the HMD 110 detects the tilt and transmits information about the tilt to the image generating device 310. The image generating device 310 receives information about the operation of the user through the communication unit 330, and the user input detecting unit 410 detects the operation of the user's head based on the received information. Also, when a user performs a predetermined operation or operation, such as lifting the controller 210, shaking the controller 210 left or right, or pressing a button, the sensor 260 provided in the controller detects the operation and/or operation and transmits information about the operation and/or operation to the image generating device 310 using the controller 210. The image producing device 310 receives information related to the user's controller operation and operation through the communication unit 330, and the user input detecting unit 410 detects the user's controller operation and operation based on the received information.

Subsequently, the character control unit 420 of the control unit 340 controls the operation of the second character in the virtual space based on the operation of the detected user (S108). For example, based on the user detecting an operation to tilt the head, the character control unit 420 controls to tilt the head of the second character. The character control unit 420 also controls the opening of the finger (i.e. "by") by shaking the arm of the second character, based on the fact that the user has raised the controller to the right and left or pressed a predetermined button on the controller. In this manner, the character control unit 420 controls the second character to perform the corresponding operation each time the user input detecting unit 410 detects an operation by a user transmitted from the HMD 110 or the controller 210. The parameters related to the operation and/or operation detected by the user input detecting unit 410 are stored in the second track of the track storage unit 530. Alternatively, the character may be controlled to perform a predetermined performance action without user input, the action data relating to the predetermined performance action may be stored in a second track, or both user action and action data relating to a predetermined operation may be stored.

Subsequently, the recording and reproduction executing unit 440 confirms whether or not the user receives the instruction to end the recording (S109), and when the instruction to terminate the recording is received, the recording of the second track related to the second character is completed (S110). The recording and reproduction executing unit 440 continues the recording process unless the user receives an instruction to end the recording. Here, the recording and reproduction executing unit 440 may perform the process of automatically completing the recording when the operation by the user acting as a character is no longer detected.

Figure 10:
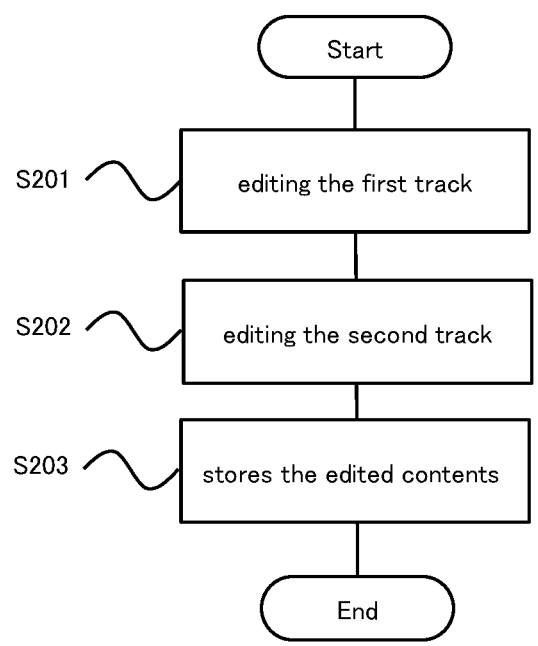
FIG. 10 is a flowchart illustrating an example of a track editing process according to an embodiment of the present invention.

FIG. 10 is a flowchart illustrating an example of a track editing process according to an embodiment of the present invention.

Figure 11:
FIG. 11(a) is a diagram illustrating an example of a user interface for editing a track according to an embodiment of the present invention.
FIG. 11(b) is a diagram illustrating an example of a user interface for editing a track according to an embodiment of the present invention.
Figure 11:
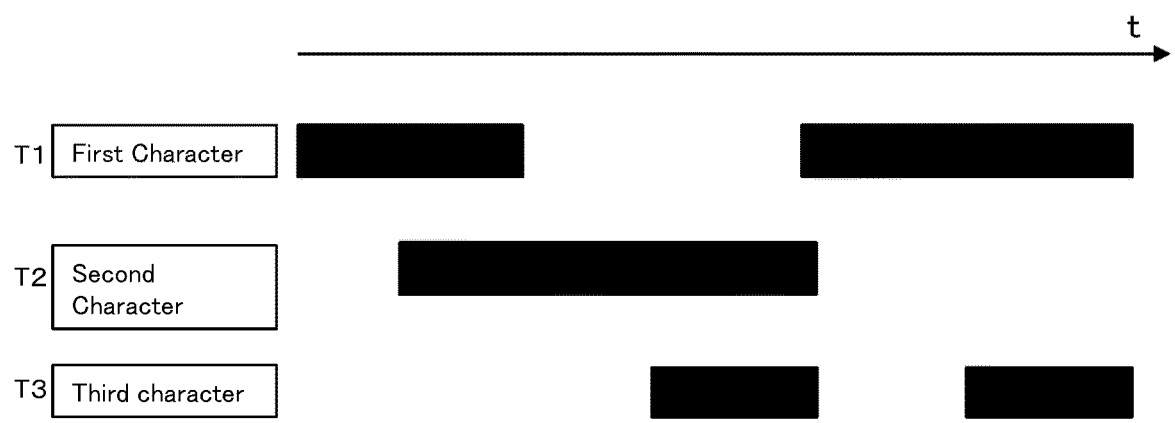

First, the editing execution unit 450 of the control unit 340 of the image generating device 310 performs a process of editing the first track stored in the track storage unit 530 (S201). For example, the user edits a first track (T1) associated with the first character via a user interface for track editing, as shown in FIG. 11(a). For example, the user interface displays the area in which the first track is stored along a time series. The user selects a desired bar so that the 3D model of the character is rendered based on the parameters and character data of the stored moving image, and the moving image of the character (e.g., the character 4) disposed in the virtual space as shown in FIG. 1 is reproduced. It should be noted that as a user interface for editing tracks, it is also possible to display, for example, a track name and title (e.g., a "first character") in a list format, in addition to the display described above. Alternatively, the user interface may allow editing to be performed while the moving image of the character is played directly, or a keyframe of the moving image may be displayed in which the user selects the keyframe to be edited, without showing the tracks or lists as shown in FIG. 11. In addition, among the 3D characters displayed as a dynamic image, it is possible to perform a process such as changing the color of the character selected as an editing target by the selected time.

As an editing process, for example, in FIG. 1, it is contemplated that the placement position of the character 4 corresponding to the first character is changed in the virtual space 1, the shooting position and angle of the character 4 is changed, and the shooting viewpoint (FPV, TPV) is changed. It is also possible to change or delete the time scale.

Alternatively, a portion of the operation of the character 4 may be changed as an editing process. For example, for a first character played back in a track (T1), a user may specify a part of the body to be edited and only operate the specified part by operation using the controller 210 or the HMD 110. For example, a user may specify an arm of a first character to manipulate only the arm of the first character by the operation of controller 210 while playing back the operation of the first character to modify the movement of the arm.

Next, the editing execution unit 450 performs the process of editing the second track stored in the track storage unit 530 (S202). For example, the user selects the option (not shown) to edit a second track (T2) associated with the second character via a user interface for track editing, and places a bar, via a user interface, as shown in FIG. 11b, indicating the area in which the second track is stored along a time series. As shown in FIG. 11(b), the user can adjust the second track relatively, such as synchronizing the playback timing of each track while editing the second track independently of the first track. Similarly, the user may edit other tracks (e.g., a third track (T3)).

As an editing process, for example, in FIG. 1, it is contemplated that the placement position of the character 5 corresponding to the second character is changed in the virtual space 1, the shooting position and angle of the character 5 is changed, and the shooting viewpoint (FPV, TPV) is changed. It is also possible to change or delete the time scale. Here, as an editing process, the user may change the placement position of the second character 5 in the virtual space 1 opposite the character 4 corresponding to the first character.

Further, by playing back each track as an editing process, an animated moving image that is realized in a virtual space as a whole can be created by playing an active image including the operation of a character corresponding to each track in a virtual space. In addition, by playing back each track, it is possible to edit animated moving images that can even be realized in a virtual space by not only reproducing the movement of the character, but also changing the set of the background of the character, increasing or decreasing the object head containing the character, changing the setting of writing, changing the clothing of the character or attaching an accessory, changing the wind amount or direction of the character, and changing the character as is the action data.

After the editing process is completed, the editing execution unit 450 stores the edited contents in response to a user's request or automatically (S203).

The editing process of S201 and S202 can be performed in any order, and can be moved back and forth. The storage processing of S203 can also be performed each time the editing of S201 and S202 is performed. Editing can also be terminated by editing S201 only.

In addition, the track generation process described above can be executed independently for each user. Accordingly, after a track generation process is performed by the first user, a track generation process can be performed by the second user. Accordingly, for example, after the first user operates the character 4 and stores the performance in the first track storage section 530 as a track in which the first user operates, the second user can control the camera 3 by operating the camera 2 while playing the first track, take a later picture of the performance of the character 4, and store the operation of the camera 3 (or the operation of the camera man 2) in the second track. This allows the first and second tracks to be executed to create an image captured by the second user of the character 4 performed by the first user.

The track editing process described above can also be performed independently for each user. Accordingly, after the track creation process is performed by the first user, the editing process of the track created by the first user by the second user can be performed. Accordingly, the operation of one object can be defined by the operation in which the first user and the second user bring together their favorite parts. For example, after the first user operates the character 4 to record the wrap operation on the track, the second user may manipulate the character 4 to add a dance operation that is performed between the wraps. In this way, even if the same character 4 is used, when performing a different movement, a user who is skilled in the art is able to perform the operation according to the movement, thereby enabling the overall performance of the high-quality movement.

As described above, by applying the method of multitrack recording (MTR) to the animation production according to the present embodiment, the character operation linked to the user operation can be stored in each track, and the animation production can be realized easily and efficiently by performing editing work within each track or between each track.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in this embodiment, while a character has been described as an example with respect to a track generation method and an editing method, the method disclosed in this embodiment may be applied to an object (vehicle, structure, article, etc.) comprising an action, including not only a character, but also a character.

For example, although the image producing device 310 has been described in this embodiment as separate from the HMD 110, the HMD 110 may include all or part of the configuration and functions provided by the image producing device 310.

Explanation of Symbols 1 virtual space
2 cameraman
3 cameras
4 characters
5 characters
110 HMD
210 controller
310 Image Generator

The invention claimed is:

1. An animation production method comprising:
placing a first and second objects and a virtual camera in a virtual space;
controlling an action of the first object in response to an operation from a first user;
controlling an action of the second object in response to an operation from a second user; and
controlling the camera in response to an operation from the first or second user to shoot the first and second objects.

2. The animation production method according to claim 1, the method further comprising:
recording the action of the first object in a first track; and
controlling the action of the second object while playing back the action of the first object recorded on the first track.

3. The animation production method according to claim 1, wherein:
the second object is the same object as the first object, the method further comprising:
recording the action of the first object in a first track; and
changing the action of the first object in response to the operation of the second user while playing back the action of the first object recorded in the first track.

* * * * *